(12) United States Patent
Sen et al.

(10) Patent No.: US 9,698,838 B1
(45) Date of Patent: Jul. 4, 2017

(54) REAL-TIME BLOCKER-ADAPTIVE BROADBAND WIRELESS RECEIVER FOR LOW-POWER OPERATION UNDER CO-EXISTENCE IN 5G AND BEYOND

(71) Applicant: Intel Corporation, Santa Clara, CA (US)

(72) Inventors: Shreyas Sen, Hillsboro, OR (US); Ritesh Bhat, Hillsboro, OR (US); Yanjie Wang, Hillsboro, OR (US); Stefano Pellerano, Beaverton, OR (US); Christopher Hull, Portland, OR (US); Farhana Sheikh, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/998,107

(22) Filed: Dec. 23, 2015

(51) Int. Cl.
| | |
|---|---|
| *H04B 1/10* | (2006.01) |
| *H04L 27/14* | (2006.01) |
| *H04W 52/02* | (2009.01) |
| *H04B 1/16* | (2006.01) |
| *H04W 88/06* | (2009.01) |

(52) U.S. Cl.
CPC ............. *H04B 1/1027* (2013.01); *H04B 1/16* (2013.01); *H04L 27/14* (2013.01); *H04W 52/0209* (2013.01); *H04W 88/06* (2013.01)

(58) Field of Classification Search
CPC ...... H04B 1/109; H04B 1/006; H04B 1/0475; H04B 1/1027; H04B 15/00; H04B 1/10
USPC ... 455/127.5, 574, 293, 311, 323, 333, 63.1, 455/278.1, 296
See application file for complete search history.

(56) References Cited

U.S. PATENT DOCUMENTS

| | | | | |
|---|---|---|---|---|
| 6,801,760 | B2 * | 10/2004 | Hutchison | H04B 1/109 455/127.3 |
| 8,219,060 | B2 * | 7/2012 | Bhagat | H01F 17/0006 336/200 |
| 8,331,978 | B2 * | 12/2012 | Bhagat | H01F 17/0006 336/200 |
| 8,565,669 | B2 * | 10/2013 | Gudem | H03F 1/0244 455/1 |
| 8,571,510 | B2 * | 10/2013 | Liu | H03F 1/32 455/293 |

(Continued)

OTHER PUBLICATIONS

David Murphy, et al.; "A Blocker-Tolerant, Noise-Cancelling Received Suitable for Wideband Wireless Applications"; IEEE Journal of Solid-State Circuits, vol. 47, No. 12, Dec. 2012, p. 2943-2963.

*Primary Examiner* — Sonny Trinh
(74) *Attorney, Agent, or Firm* — Eschweller & Potashnik, LLC

(57) ABSTRACT

A receiver system includes a blocker detector circuit configured to receive a radio frequency (RF) input signal and detect an existence of a blocker therein, and further configured to output a blocker detection signal indicative of the existence of the blocker. The receiver system further includes a configurable receiver circuit configured to receive the RF input signal and the blocker detection signal, and selectively configure the configurable receiver circuit between a first mode wherein the configurable receiver circuit exhibits first linearity characteristics, and a second mode wherein the configurable receiver circuit exhibits second, different linearity characteristics based on the blocker detection signal.

22 Claims, 7 Drawing Sheets

(56) References Cited

U.S. PATENT DOCUMENTS

| | | | | |
|---|---|---|---|---|
| 8,676,143 B2* | 3/2014 | Thomas | ............... | H04B 1/006 |
| | | | | 370/286 |
| 8,755,756 B1* | 6/2014 | Zhang | ................. | H04B 1/109 |
| | | | | 455/114.2 |

* cited by examiner

REAL-TIME BLOCKER-ADAPTIVE BROADBAND WIRELESS RECEIVER FOR LOW-POWER OPERATION UNDER CO-EXISTENCE IN 5G AND BEYOND

BACKGROUND

Future mobile communication platforms require multiple radios to operate simultaneously, creating co-existence issues. For example, a Wi-Fi receiver co-existing with an LTE transmitter needs to handle the LTE blocker (i.e., interference) and hence needs high linearity to ensure the receiver is not saturated. However, such high linearity receivers consume a significant amount of power which is disadvantageous for mobile devices that utilize a battery for power.

DETAILED DESCRIPTION

Figure 1:
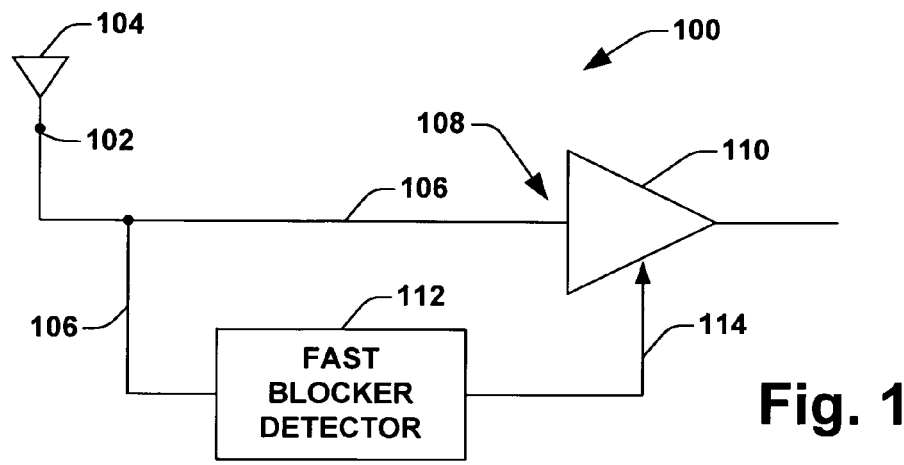
FIG. 1 is a block diagram of a receiver circuit according to one embodiment of the disclosure.

A device and method are disclosed that are directed to an adaptive wireless receiver circuit and associated method in a wireless communication device such as a User Equipment (UE), for example.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Future wireless communication platforms require multiple radios to operate simultaneously, creating co-existence issues. For example, a Wi-Fi receiver co-existing with an LTE transmitter needs to handle the LTE blocker and hence needs high linearity to ensure the receiver is not saturated, which comes at a cost of high receiver power. A traditional solution to the co-existence issue employs a static high linearity receiver, which means the Wi-Fi receiver, in this example, will always consume high power, even when the LTE blocker is not present. In the present disclosure, a real-time blocker adaptive receiver is disclosed that is configured to sense blocker strength and dynamically adapt the receiver to save power when a blocker is not present.

Conventional narrowband receiver circuits require multiple off-chip passive filters, which increase receiver cost. According to one embodiment of the disclosure, a braodband receiver is disclosed that can cover multiple frequency bands (e.g., 0.5 GHz-3.8 GHz) and does not require expensive passive external filters. The architecture of the present disclosure exhibits strong receiver performance with high linearity by adaptively reconfiguring itself in two distinct modes: (1) a low-power mode where high linearity is not required (e.g., a voltage mode receiver configuration), and (2) high linearity mode (e.g., a current mode receiver configuration). In one embodiment, a sensing circuit is utilized to identify a presence of a blocker, and if a blocker exceeding a predetermined criteria is identified, the high linearity mode is employed. Alternatively, if no blocker is identified or a blocker does exist but does not exceed the predetermined criteria, the lower power mode is utilized, wherein 2-4× less power is consumed yet the same noise figure is provided as the high linearity mode.

Thus in one embodiment the receiver circuit and method of the present disclosure only consume significant power in high linearity situations when a blocker is present. In one embodiment the receiver utilizes a current-mode receiver that comprises a low noise transconductance amplifier (LNTA) and a transimpedance amplifier (TIA) to achieve high linearity. In one embodiment the presence of a blocker is detected using a faster blocker detector circuit, and uses the output of such circuit to configure the receiver circuit. When a blocker is not present the receiver circuit is reconfigured to a low-linearity, low-power voltage mode amplifier configuration.

Turning now to the figures, FIG. 1 is a block diagram illustrating a receiver system 100 according to one embodiment of the disclosure. The receiver system 100 comprises an antenna port 102 configured to couple to an antenna 104. A radio frequency (RF) input signal 106 is received by the antenna and delivered to an input 108 of a configurable receiver circuit 110. The receiver system further comprises a blocker detector circuit 112 arranged in a feedforward type loop architecture with the configurable receiver circuit 110. The blocker detector circuit 112 receives the RF input signal 106 and outputs a blocker detection signal 114 that is indicative of an existence of a blocker in the RF input signal 106. That is, in one embodiment the blocker detector circuit outputs a blocker detection signal that is on state (e.g., high) if a blocker is detected and is another, different state (e.g., low) if no blocker is detected in the RF input signal.

The configurable receiver circuit 110 receives the RF input signal 106 and the blocker detection signal 114 and selectively configures itself between one of a first mode and a second mode, wherein the first and second mode configurations exhibits different linearity characteristics and consume different amounts of power. In one embodiment illustrated in FIG. 2A, the configurable receiver circuit 110 operates in a first mode when the blocker detection signal 114 has a state indicative of an existence of a blocker in the RF input signal. In such state the first mode circuit configuration 110a exhibits relatively high linearity characteristics and exhibits a first power consumption. In another instance, when the blocker detection signal 14 has a state indicative of no blocker in the RF input signal 106, the second mode circuit configuration 110b of the configurable receiver circuit 110 exhibits relatively low linearity characteristics and exhibits a second power consumption. In one embodiment the relatively high linearity characteristics are greater than the relatively low linearity characteristics and the first power consumption is greater than the second power consumption.

Figure 2A:
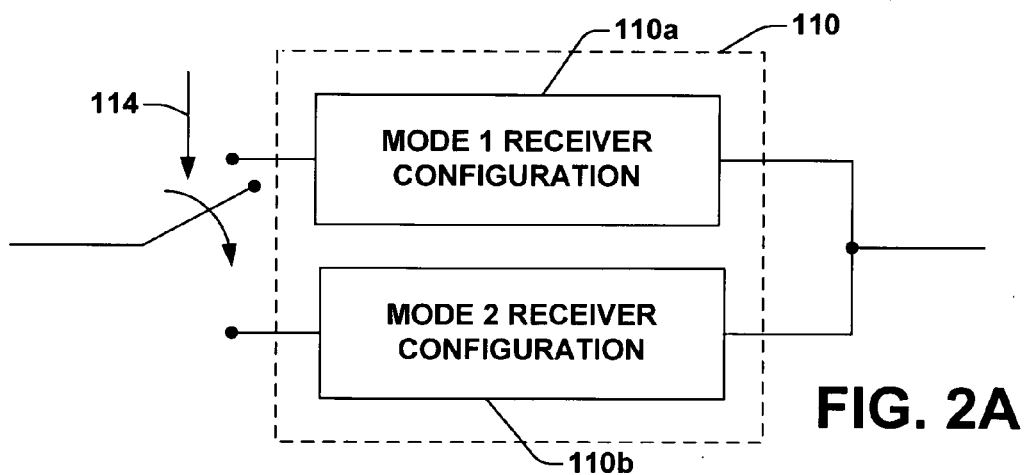
FIG. 2A is a block diagram illustrating a receiver circuit having first and second mode receiver configurations based on a blocker detection signal according to one embodiment of the disclosure.
Figure 2B:
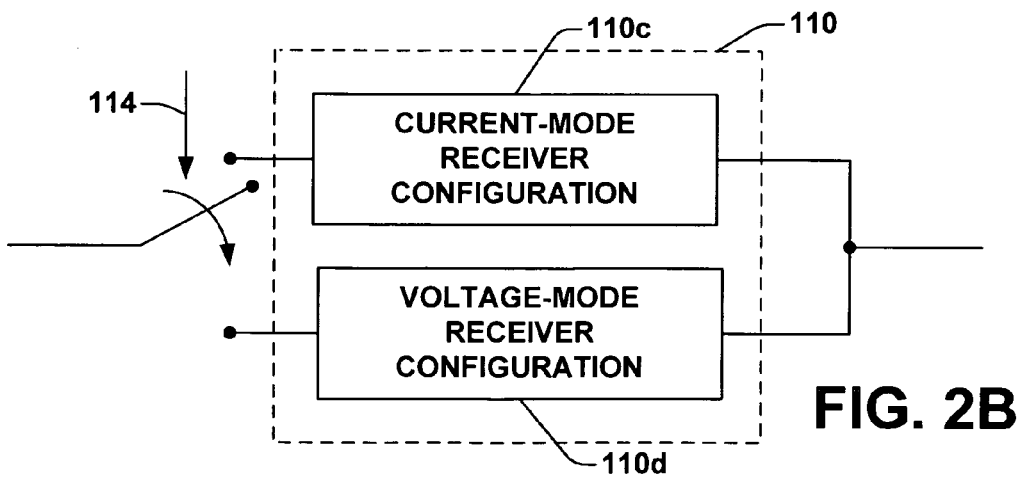
FIG. 2B is a block diagram illustrating a receiver circuit having a current-mode receiver configuration or a voltage-mode receiver configuration based on a blocker detection signal according to one embodiment of the disclosure.

Still referring to FIG. 1 and further referring to FIG. 2B, in one embodiment the configurable receiver circuit 110 comprises circuitry that configures itself in the first mode as a current mode receiver 110c and configures itself in the second mode as a voltage mode receiver 110d. Further details of the configurations of the configurable receiver circuit 110 will be described in conjunction with the drawings and description provided infra.

The blocker detector 112 provides for a fast detection of a blocker due to the feedforward topology that differs from conventional solutions that employed a feedback type topology. In a feedforward architecture, the RF input signal 106 to be evaluated is fed directly into the fast blocker detector 112, in one embodiment, and then sends the evaluation result to the receiver 110. By employing a fast feedforward architecture rather than feedback a blocker can be detected quickly and potential loss of data is avoided.

Figure 3:
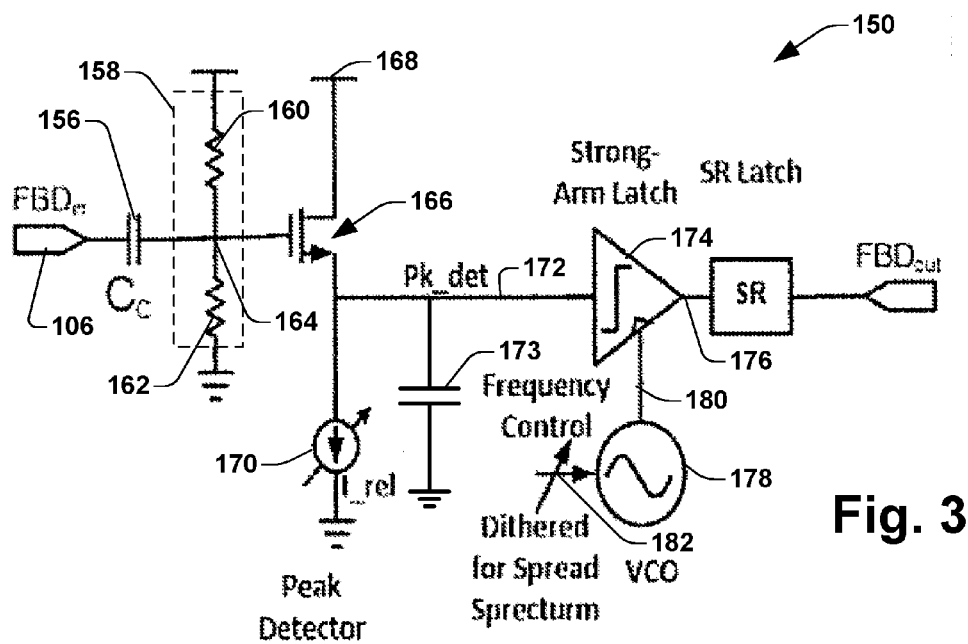
FIG. 3 is a schematic diagram illustrating a fast blocker detector circuit for detecting a blocker in an RF input signal according to one embodiment of the disclosure.

Turning now to FIG. 3, a schematic diagram is provided illustrating a blocker detector circuit 150 according to one embodiment of the disclosure. The blocker detector circuit 150 may operates as the blocker detector circuit 112 in FIG. 1 in one embodiment. The blocker detector circuit 150 is configured to receive an RF input signal such as RF input signal 106 in FIG. 1, and output a signal 114 at an output 152 thereof that has a state that is indicative of whether a blocker exists within the input RF signal. In the embodiment illustrated in FIG. 3, the signal 114 is a high value when a blocker is detected in the RF input signal 106 and is low otherwise. Alternatively, a different state may be utilized and all such alternatives are contemplated as falling within the scope of the present disclosure.

In one embodiment the blocker detector circuit 150 operates continuously and in another embodiment the blocker detector circuit 150 performs a blocker detection once per symbol period or once per time frame associated with a data packet or one per some other time interval, and all such variations are contemplated as falling within the scope of the present disclosure.

In the blocker detector circuit 150 of FIG. 3, an input node 154 receives the RF input signal 106 and a DC blocking capacitor 156 operates to block a DC component of the RF input signal 106 while passing the AC component thereof. A DC biasing circuit 158 composed in one embodiment of a voltage divider of series resistors 160 and 162 sets a DC bias voltage on which the AC component of the RF input signal resides. A bias mode 164 of the DC biasing circuit 158 is coupled to a control terminal of a transistor 166. The transistor 166 in one embodiment is coupled between a supply voltage 16 and a variable current source 170 that in turn is connected to a predetermined potential such as ground. In one embodiment the transistor 166 has a source terminal that forms an output 172 of a peak detector circuit (composed of the transistor 166 and current source 170). The output 172 of the peak detector is a source-follower type circuit that follows the voltage at the gate or control terminal of the transistor 166.

The output 172 of the peak detector has the tunable current source 170 in parallel with a capacitor 173. By varying the current of the tunable current source 170 the bandwidth of the peak defector can be varied. For example, if $I_{rel}$ of the current source 170 is a large DC current value the resistance thereof is small and the source follower (transistor 166) passes both the carrier signal (i.e., the RF input signal 106) and any higher frequency artifacts (e.g., a blocker). Alternatively, if the $I_{rel}$ of the current source 170 is low, the resistance thereof is high and the carrier is blocked and only the blocker (if any) is passed.

The output 172 of the peak detector is connected to an input of a latch 174, for example, a fast strong arm latch in one embodiment. The latch 174 operates like a comparator circuit, wherein the input signal at 172 is compared to a predetermined threshold. When the signal at the input 172 exceeds the threshold the output 176 goes high, and when the signal at the input 172 falls below the threshold, the output 176 goes low. In one embodiment the latch 174 is clocked by a voltage controlled oscillator (VCO) circuit 178. By periodically "gating" the latch 174 with the VCO clock signal 180, the output 176 of the latch 174 is prevented from flickering back and forth in those situations where the input signal 172 is near the latch threshold. Further, in one embodiment an input control signal 182 of the VCO is varied to vary the VCO clock signal 180 and thus recue a potential of untended interference.

The output 176 of the latch 174 is provided as an input to an SR latch 184 thus providing the digital output which can be the blocker detection signal 114 that has a state indicative of an existence of a blocker in the RF input signal 106.

The blocker detector circuit 150 operates to detect a blocker in the RF input signal in as fast as several nanoseconds. Since the symbol period for the received data is in the order of microseconds, the blocker detection circuit 150 (e.g., circuit 112 in FIG. 1) can provide the blocker detection signal 152 (e.g., circuit 114 in FIG. 1) that allows for a configuration of the configurable receiver circuit 110 without the loss of any data. That is, the input data frame has a header portion and a payload portion and the detection by the blocker detection circuit 150 is fast enough so that a blocker can be detected at the configurable receiver 110 can be configured in a time frame associated with the header such that by the time the payload is arriving at the receiver, it is appropriately configured with the configuration causing the loss of any data.

Figure 4:
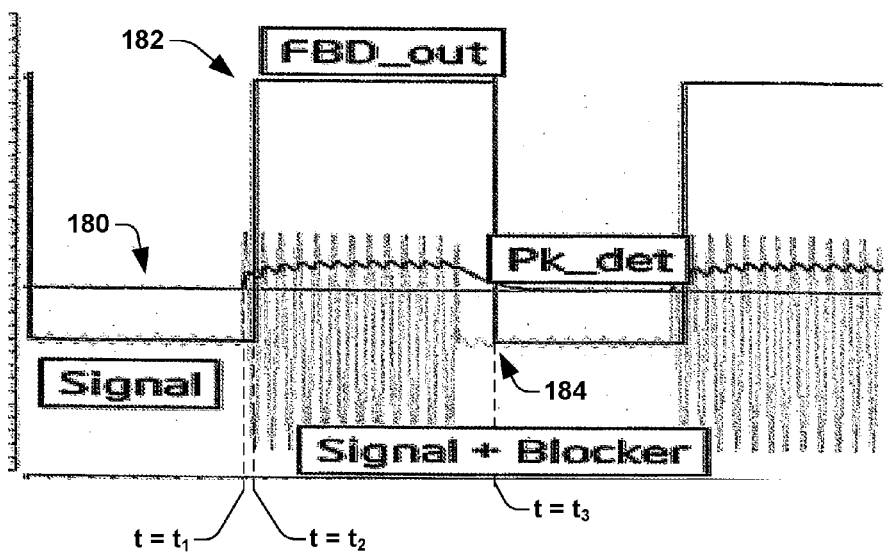
FIG. 4 is a signal timing diagram illustrating voltage signals at various nodes of the fast blocker detector circuit of FIG. 3 according to one embodiment of the disclosure.

FIG. 4 is a graph showing the RF input signal 106 (including any blocker), a peak detect signal at node 172 of the circuit 150, and the blocker detection signal 152 according to one embodiment such as in the blocker detector circuit 150 of FIG. 3. Before $t=t_1$, no blocker signal exists on the RF input signal 106 and thus the peak detector signal at node 172 is a constant value at 180. At $t=t_1$, a blocker signal occurs on the RF input signal 106 and the peak detector signal at node 172 begins to rise and oscillator at a frequency of the blocker, thus causing the latch 174 to be triggered such that an output thereof goes high at 182 which is then latched by the SR latch at the output 152 at $t=t_2$. Upon the blocker going away, the peak detector voltage at node 172 begins to fall and when such voltage falls below the latch threshold the output of the latch 174 goes low, which is then latched by the SR latch at the output 152, which is seen at 184 in FIG. 4 at $t=t_3$ and a timing at which the output 152 goes high indicating identification of the blocker at $t=t_2$ is very small, on the order of nanoseconds. Thus the blocker detector circuit 150 can operate in a feedforward fashion to quickly identify the existence of a blocker and give sufficient time to configure the configurable receiver 110 without any loss of data.

Figure 5:
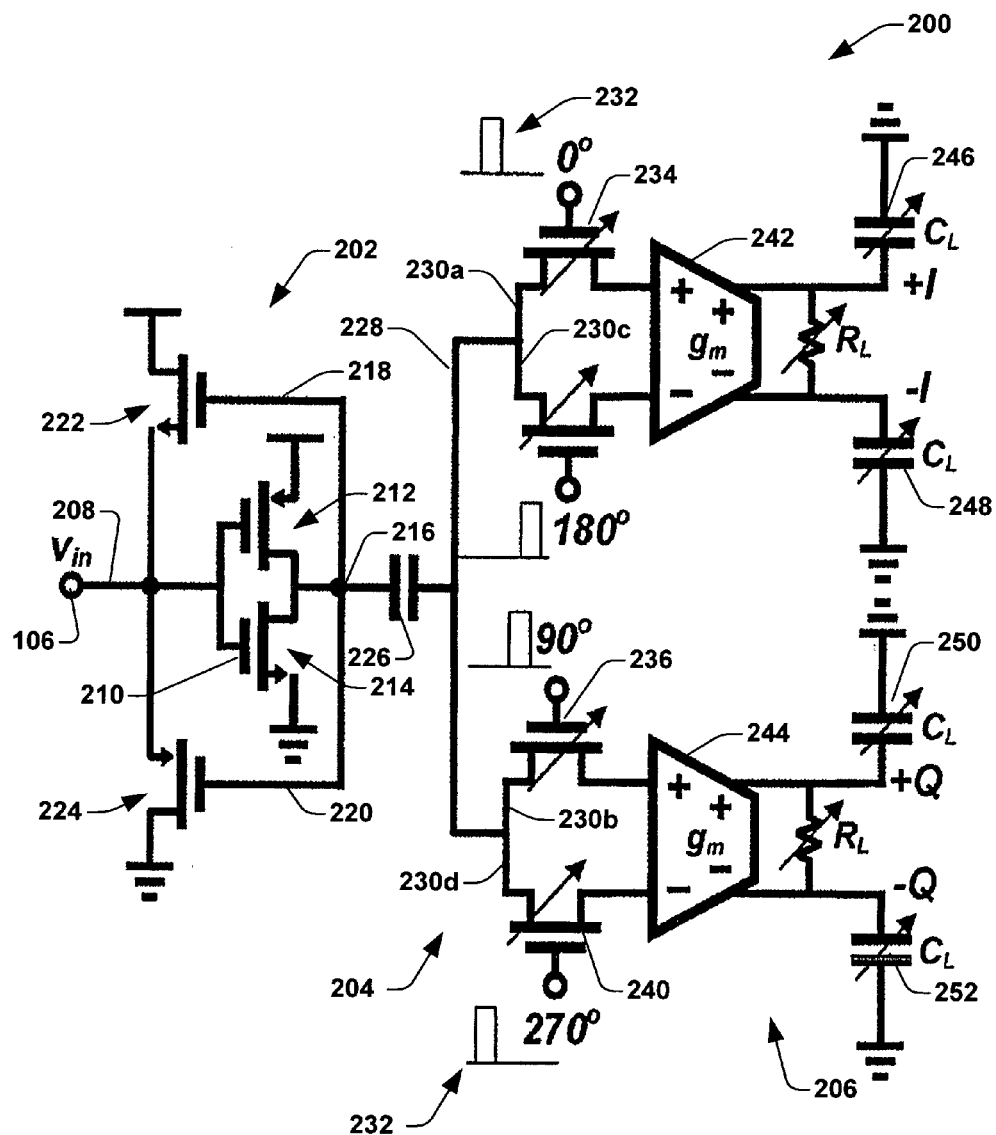
FIG. 5 is a schematic diagram illustrating a voltage-mode receiver circuit according to one embodiment of the disclosure.

As highlighted above, the configurable receiver 110 of FIG. 1 is configured to operate in two different modes exhibiting different linearity characteristics and/or different power consumptions based on the output of the blocker detector circuit 112, 150 of FIG. 1 or 3. In one embodiment highlighted in FIG. 2B, the two modes represent a current-mode converter configuration 110c when the blocker detector circuit 112, 150 indicates the existence of a blocker and a voltage-mode converter configuration 110d when the blocker detector circuit 112, 150 indicates no blocker exists within the RF input signal 106. In one embodiment of the disclosure a voltage-mode converter amplifier configuration is illustrated in FIG. 5 at reference numeral 200.

The voltage-mode receiver configuration 200 has three basic portions (1) a low-noise amplifier (LNA) portion 202, a source phase passive mixer portion 204, and a voltage mode baseband amplifier 206. The voltage-mode receiver configuration 200 provides for a low power operation due to the high impedance associated therewith. The RF input signal 106 is provided to an input 208 that is provided to control terminals 210 of two series-connected transistors 212, 214 that are arranged as an inverter. An output 216 of the LNA portion 202 is feedback via feedback paths 218 and 220 to transistors 222 and 224, thereby establishing an active feedback structure in one embodiment. Alternatively, the active devices 222 and 224 may be replaced by passive devices such as resistors to create a passive feedback structure, in another embodiment. The feedback paths 218 and 220 and active feedback devices 222 and 224 are provided to alter the input impedance oat the input 208. Normally, the input impedance at 208 looking into the gates of the devices 2212 and 214 would be extremely high, however, the input 208 is advantageously matched to the impedance at the antenna port 102 of FIG. 1, which is typically a 500 load.

Thus the active feedback structure of devices 222 and 224 operates to reduce the input impedance to facilitate broadband matching at the input of the voltage-mode configuration. The signal at the output 216 of the LNA portion is provided to a blocking capacitor 226 that t operates to block any DC offset and pass through the RF input signal 106.

The blocking capacitor 226 operates as an input to a 25% duty cycle 4-phase passive mixer portion 204. The RF input signal 106 is inverted by the LNA portion 202 and the AC portion of the inverted signal is passed by the blocking capacitor 226. The AC signal portion 218 is then passed to four different paths 230a, 230b, 230c, and 230d that are selectively activated by a different phase of an location oscillator (LO) signal 232. That is, in a first path 230a the AC signal portion passes through transistor 234 during a first phase (e.g., 0°) of the LO signal 232. Likewise, a second path 230b is activated when transistor 236 is turned on during a second phase (e.g., 90°) of the LO signal 232 and similarly with third and fourth paths 230c and 230d during third and fourth phases (e.g., 180° and 270°) of the LO signal 232. During each respectively phase an amplifier 242, 244 operates as a voltage mode amplifier in that such amplifier 242, 244 has a high input impedance and exhibits no feedback. Therefore the respective amplifier 242, 244 passes the respective phase portion of the AC signal 228 to an input thereof (and its respectively amplifier gain), which is then sampled by a charging of a respective load capacitor $C_L$ 246, 248, 250, 252. In one embodiment the amplifiers 242 and 244 may be stacked complementary common-source circuits that exhibits a reduced flicker noise corner and exhibit low power consumption. While the voltage-mode receiver configuration 200 exhibits relatively low linearity, because such a configuration is chosen when no blocker is detected in the RF input signal 106, high linearity is not required and the receiver advantageously consumes low power to help conserve battery life when higher linearity amplifier characteristic are not needed.

In a second mode of operation, when a blocker is detected in the RF input signal 106, the configurable receiver 110 of FIG. 1 is configured to exhibit a relatively high linearity characteristics compared to the first mode. In one embodiment the configurable amplifier 110 of FIG. 1 configures itself as a current-mode receiver configuration, as illustrated in FIG. 2 and as illustrated in greater detail in FIG. 6 at reference numeral 300.

The current-mode receiver configuration 300 has four parts: (1) a low impedance low noise transconductance amplifier 302, (2) a 25% duty cycle 4-phase passive mixer 304, (3) a transimpedance amplifier 306, and (4) a voltage gain amplifier stage 308. The low impedance transconductance amplifier stage 302 has an input node 310 that receives the RF input signal 106 and converts the voltage thereof into a current at an output 312. The transconductance amplifier stage 302 comprises two series-connected transistor 314 and 316 arranged as an inverter. The input node 310 of a CMOS type inverter normally exhibits a high input impedance, however, a feedback 318 is provided from an output of the transimpedance amplifier stage 306 to reduce an input impedance at the input node 310 and thus provide broadband matching.

In one embodiment the feedback matching circuit 318 comprises a passive mixer circuit 320, a matching resistance 322 and a DC blocking capacitor 324. The blocking capacitor 324 blocks any DC signals in the feedback path 318 from creating an offset at the input node 310. The RF input signal 106 is converted by the transconductance amplifier 302 from a voltage to a current at the output 312 and the AC current passes through a blocking capacitor 326 which blocks DC currents. The AC current 328 is then input to the 25% duty cycle 4-phase passive mixer stage 304 which operates in a manner similar to the passive mixer stage described in FIG. 6. The AC current 328 is selectively passed along one of four paths 330a, 330b, 330c and 330d based on a selected phase of a local oscillator (LO) signal 332.

Figure 6:
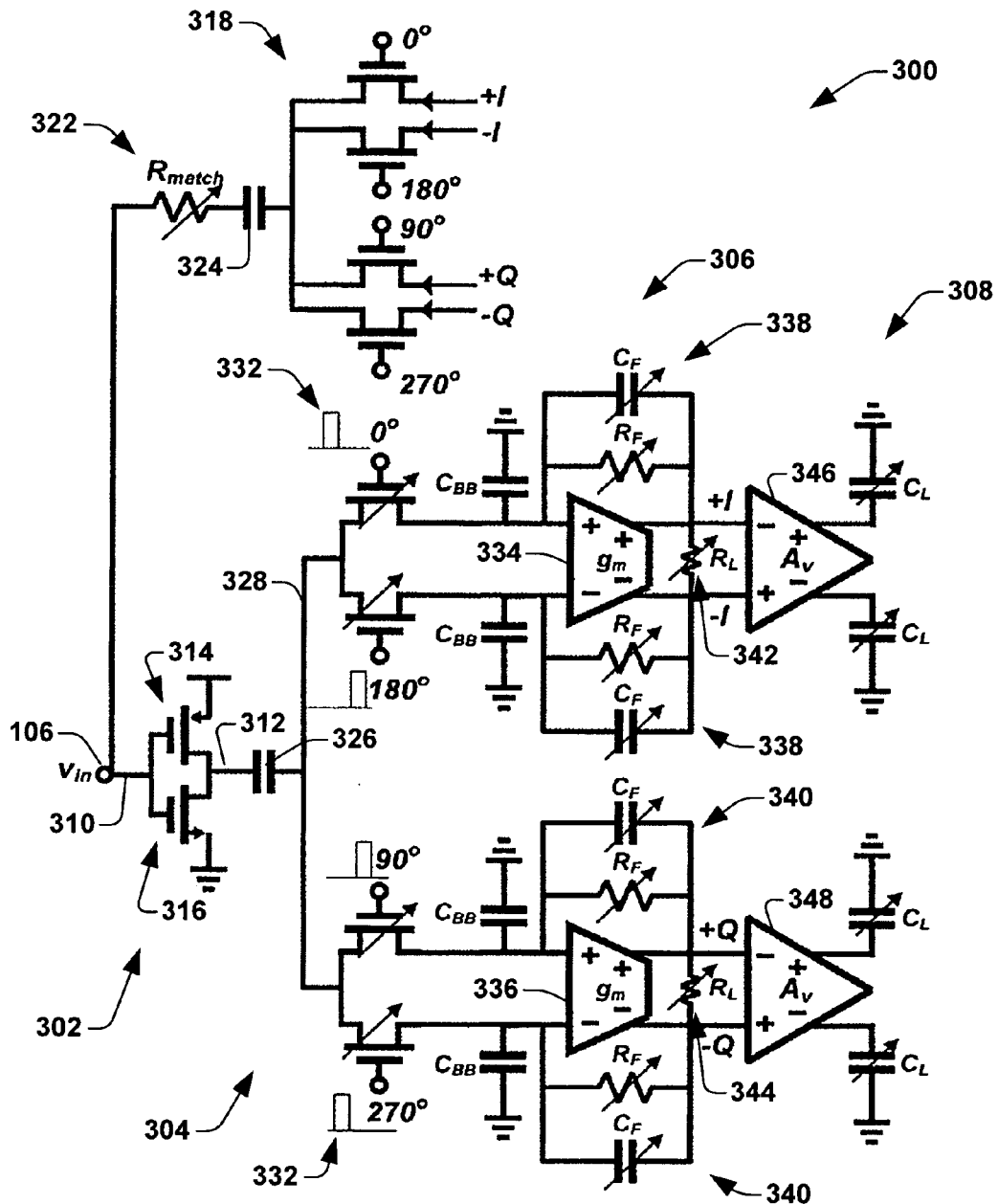
FIG. 6 is a schematic diagram illustrating a current-mode receiver circuit according to one embodiment of the disclosure.

Still referring to FIG. 6, the AC current is input to one of the transimpedance amplifiers 334, 336 via one of the respective paths 330a-330d. The transimpedance amplifier would normally exhibit a high input impedance due to an internal stacked complementary common-source architecture, however, an RC feedback network 338, 340 is provided to lower the input impedance. The load resistor 342, 344 at the output of the transimpedance amplifiers 334 and 336 convert the current to a voltage, and a voltage amplifier 346 and 348 is provided to supply a needed voltage gain, since the voltage gain in the current-mode is otherwise very low.

In one embodiment the voltage-mode receiver circuit 200 of FIG. 5 and the current-mode receiver circuit 300 of FIG. 6 may be separate circuits that are switched into or out of the desired signal path 106 based on a detection of a blocker in the signal path, wherein an existence of a blocker will result in t a selection of the high linearity current-mode receiver circuit 300, while a determination that no blocker is present results in selection of the low linearity, low power consumption voltage-mode receiver circuit 200 of FIG. 5. In another embodiment of the disclosure, the current-mode receiver circuit 300 and the voltage-mode receive circuit 200 may be integrated into a single circuit architecture via an array of switches controlled by the blocker detection signal 114 of FIG. 1, for example. Such an integrated circuit architecture is illustrated in one embodiment in FIG. 7.

Figure 7:
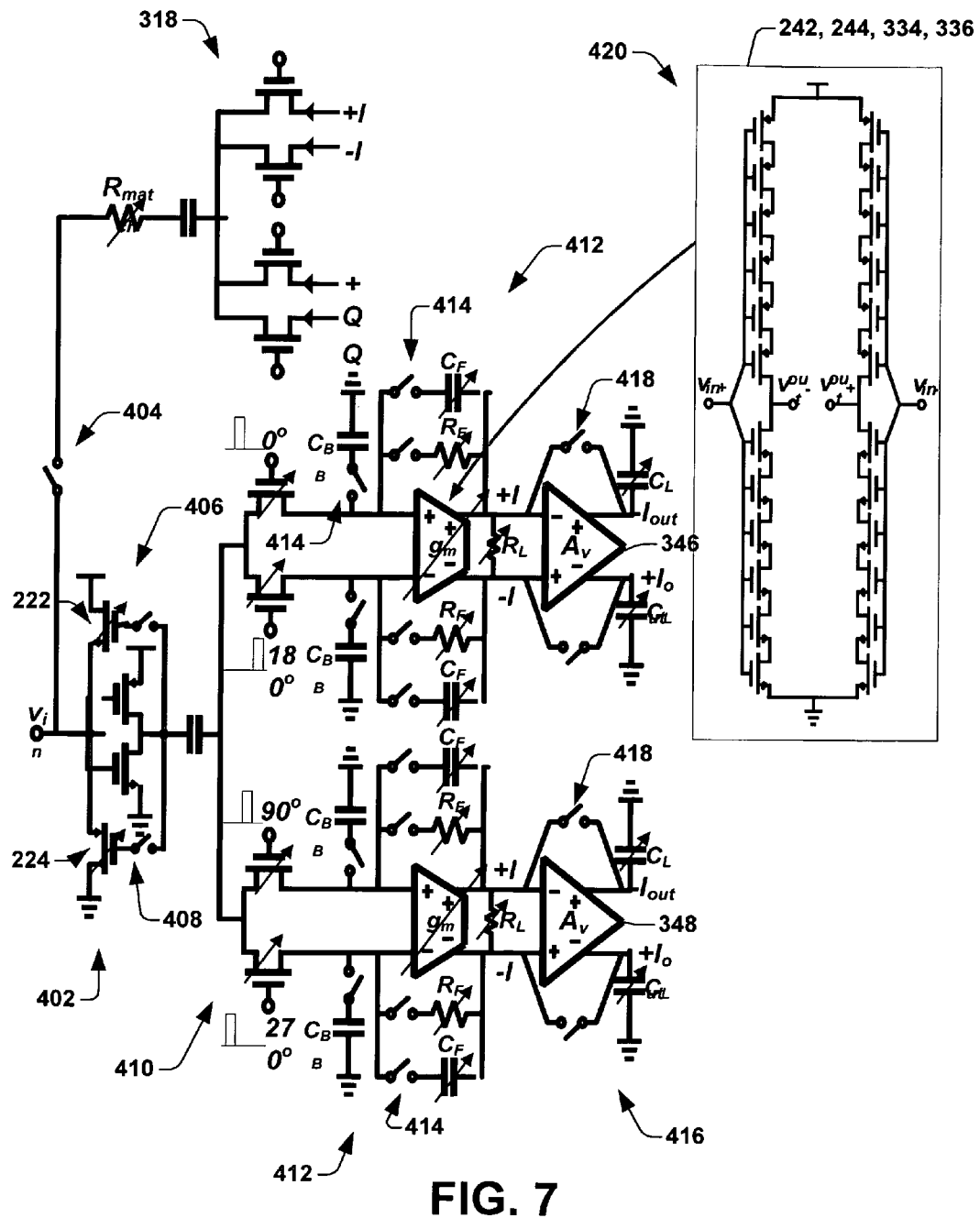
FIG. 7 is a schematic diagram illustrating a combined voltage-mode receiver circuit and a current-mode receiver circuit that may be alternatively configured via the opening and closing of various switches according to one embodiment of the disclosure.

As can be seen in FIG. 7, a circuit 400 includes the various components of circuits 200 and 300 of FIGS. 5 and 6 that are selectively enabled/disabled via a use of switches. For example, an input stage 402 includes a switch that switches in the feedback circuit 318 when a blocker is detected and a high linearity current-mode configuration is needed. As highlighted previously, the added feedback circuit 318 operates to lower an impedance at the input to provide for an impedance matching and permits the input inverter circuit 406 to operate as a transconductance amplifier. Alternatively, when no blocker is detected in the RF input signal 106, the switch 404 opens, thus disabling the feedback circuit 318 connection. Concurrently, the switches 408 at the input stage 402 close, thereby activating the active feedback structure of transistors 222 and 224 to reduce input impedance, yet maintain the inverter as a voltage-mode amplifier.

The second stage 410 of the circuit 400 of FIG. 7 remains the same, wherein the 25% duty cycle, 4-phase passive mixer operates in the same fashion in both the current-mode and the voltage-mode configuration. The third stage 412 includes switches 414 that are closed in the current-mode configuration (i.e., when a blocker is detected), thereby connecting the RC feedback network to lower an input impedance and facilitate operation as a transimpedance amplifier with a low voltage gain. In the voltage-mode (i.e., no locker detected), the switches 414 are open, thus disconnecting the feedback and thereby increasing the input impedance and having the amplifier operate as a voltage-mode baseband amplifier with high gain. The fourth stage 416 includes the voltage gain amplifiers 346 and 348 and switches 418 that are closed in the voltage-mode configuration and open in the current-mode configuration. When closed, the switches 418 short out the voltage gain amplifiers 346, 348 as they are not needed in the voltage-mode, as the upstream amplifier provides adequate voltage gain. In the current-mode, however, the switches 418 are open, thus enabling the voltage gain amplifiers 346, 348, since the upstream amplifier when operating as a transimpedance amplifier exhibits little voltage gain and thus the amplifiers 346 and 348 provide the additional, needed voltage gain in the current mode.

Figure 8A:
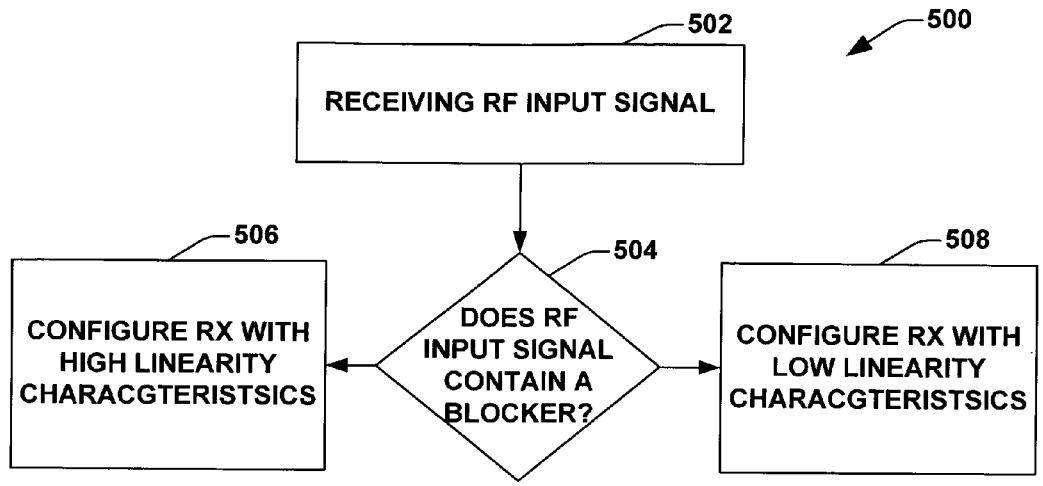
FIGS. 8A and 8B are flow chart diagrams illustrating a method of receiving and processing a radio frequency signal in one of two different modes based on a blocker detection signal according to one embodiment of the disclosure.

FIG. 8A is a flow chart illustrating a method of receiving and processing an RF signal 500. While the method provided herein is illustrated and described as a series of acts or events, the present disclosure is not limited by the illustrated ordering of such acts or events. For example, some acts may occur in different orders and/or concurrently with other acts or events apart from those illustrated and/or described herein. In addition, not all illustrated acts are required and the waveform shapes are merely illustrative and other waveforms may vary significantly from those illustrated. Further, one or more of the acts depicted herein may be carried out in one or more separate acts or phases.

The method 500 begins at 502 and comprises receiving an RF input signal, for example, in a mobile communication device or user equipment (UE). Such RF signal can be received in a system such as the UE set forth in FIG. 1 and other figures herein, in one embodiment. At 504 an evaluation is made whether the RF input signal contains a blocker. In such instances interference such as caused by co-existence issues may exist in the RF input signal. If a determination is made in the affirmative (YES at 504), the receiver circuit of the UE is configured in accordance with a mode at 506, wherein in such mode the receiver circuit exhibits high linearity characteristics in order to successfully receive the data in the RF input signal without negative affect by the blocker, despite the present of the blocker. If a determination is made in the negative (NO at 504) the receive circuit is configured in a different mode having a relatively low linearity characteristic at 508. In such an instance the low linearity configuration consumes less power than in the high linearity mode and since no blocker is present the data is successfully received without consuming the high power otherwise expended in the high linearity mode.

In the method 500, the determination of whether a blocker exists in the RF input signal can be performed by a clocker detection circuit such as the circuit 150 in one embodiment of the disclosure.

Figure 8B:
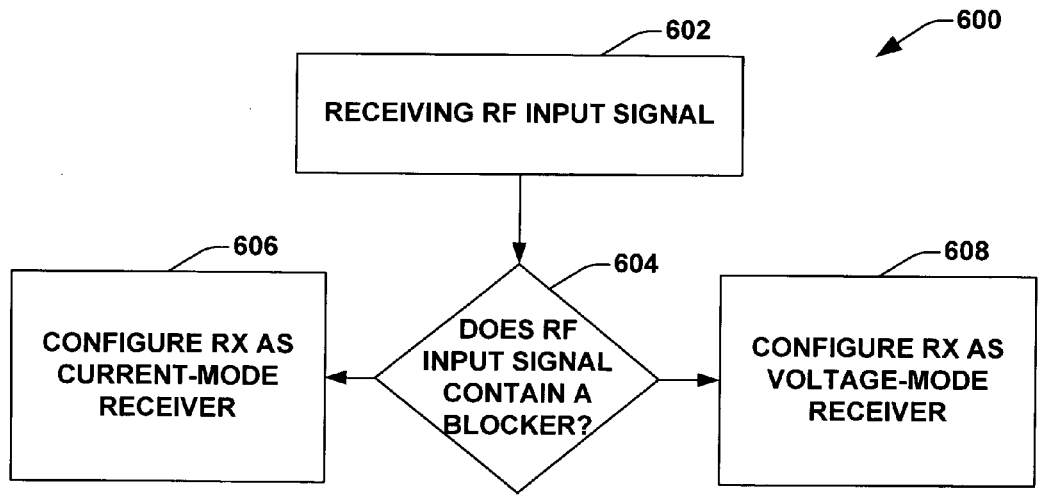

FIG. 8B is a flow chart of a method 600 according to another embodiment of the disclosure. At 602 the RF input signal is received and at 604 a determination is made whether or not a blocker is detected in the RF input signal. If so (YES at 604), the method 600 continues to 606 and the receive circuit configures itself as a current-mode receiver which exhibits a substantially high linearity characteristic which allows the data in the RF input signal to be successfully received despite the presence of the blocker. If a determination is made in the negative (NO at 604) the method 600 proceeds to 608 where the receive circuit configures itself as a voltage-mode receiver. In such a mode, a lower linearity characteristic exists and the receiver consumes less power than the current-mode receiver configuration. However, since no blocker exists, less linearity is needed and the voltage-mode receiver configuration can successfully receive the data and concurrently consume less power.

In one embodiment the configuration of the receiver circuit can involve the switching in or out of separate distinct receiver circuits having different linearity characteristics such as that alluded to in FIG. 2A or switching in or out a specific current-mode receiver circuit and a specific voltage-mode receiver as alluded to in FIG. 2B. Alternatively, a single receiver circuit may exist, such as that illustrated in FIG. 7, wherein different modes may be achieved by the opening or closing of various switches based on state of a blocker detection signal.

Figure 9:
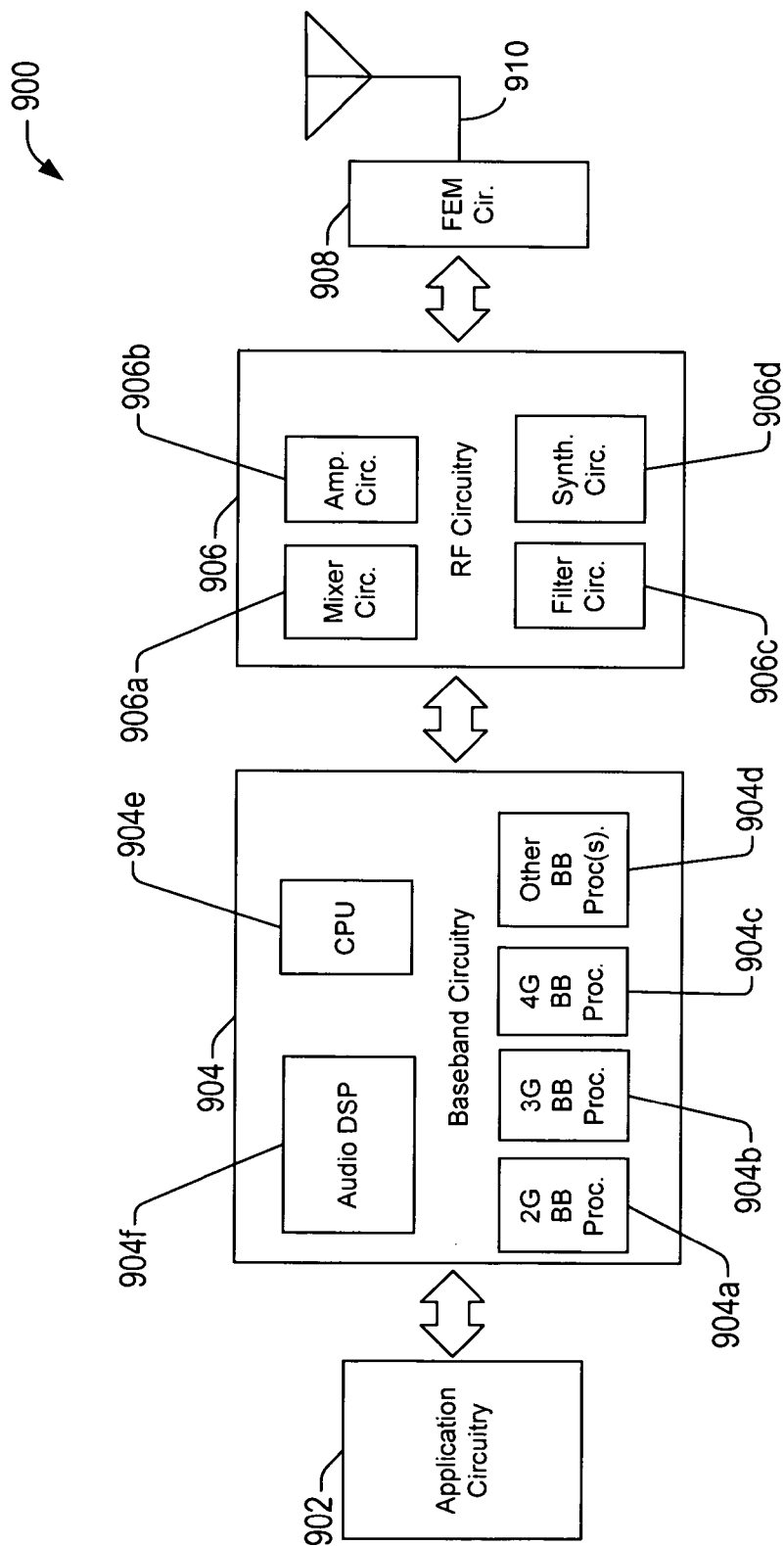
FIG. 9 is a block diagram illustrating a user equipment (UE) for implementing one or more aspects of the disclosure.

Embodiments described herein may be implemented into a system using any suitably configured hardware and/or software. FIG. 9 illustrates, for one embodiment, example components of a User Equipment (UE) device 900. In some embodiments, the UE device 900 may include application circuitry 902, baseband circuitry 904, Radio Frequency (RF) circuitry 906, front-end module (FEM) circuitry 908 and one or more antennas 910, coupled together at least as shown.

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 904 may include circuitry such as, but not limited to, one or more single-core or multi-core processors. The baseband circuitry 904 may include one or more baseband processors and/or control logic to process baseband signals received from a receive signal path of the RF circuitry 906 and to generate baseband signals for a transmit signal path of the RF circuitry 906. Baseband processing circuitry 904 may interface with the application circuitry 902 for generation and processing of the baseband signals and for controlling operations of the RF circuitry 906. For example, in some embodiments, the baseband circuitry 904 may include a second generation (2G) baseband processor 904a, third generation (3G) baseband processor 904b, fourth generation (4G) baseband processor 904c, and/or other baseband processor(s) 904d for other existing generations, generations in development or to be developed in the future (e.g., fifth generation (5G), 6G, etc.). The baseband circuitry 904 (e.g., one or more of baseband processors 904a-d) may handle various radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, and/or constellation mapping/demapping functionality. In some embodiments, encoding/decoding circuitry of the baseband circuitry 904 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 904e of the baseband circuitry 904 may be configured to run elements of the protocol stack for signaling of the PHY, MAC, RLC, PDCP and/or RRC layers. In some embodiments, the baseband circuitry may include one or more audio digital signal processor(s) (DSP) 904f. The audio DSP(s) 904f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the RF circuitry 906 may include a receive signal path and a transmit signal path. The receive signal path of the RF circuitry 906 may include mixer circuitry 906a, amplifier circuitry 906b and filter circuitry 906c. The transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 904 and may be filtered by filter circuitry 906c. The filter circuitry 906c may include a low-pass filter (LPF), although the scope of the embodiments is not limited in this respect.

In some embodiments, the mixer circuitry 906a of the receive signal path and the mixer circuitry 906a of the transmit signal path may include two or more mixers and may be arranged for quadrature downconversion and/or upconversion respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a may be arranged for direct downconversion and/or direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910.

In some embodiments, the FEM circuitry 908 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910.

In some embodiments, the UE device 900 may include additional elements such as, for example, memory/storage, display, camera, sensor, and/or input/output (I/O) interface.

In an Example 1, a receiver system is disclosed and comprises a blocker detector circuit configured to receive a radio frequency (RF) input signal and detect an existence of a blocker therein, and further configured to output a blocker detection signal indicative of the existence of the blocker. The receiver system further comprises a configurable receiver circuit configured to receive the RF input signal and the blocker detection signal, and selectively configure the configurable receiver circuit between a first mode wherein the configurable receiver circuit exhibits first linearity characteristics, and a second mode wherein the configurable receiver circuit exhibits second, different linearity characteristics based on the blocker detection signal.

In an Example 2, in Example 1 the configurable receiver circuit is configured to configure itself as a high linearity receiver operating at a first power consumption in the first mode when the blocker output signal indicates a presence of the blocker in the radio frequency input signal, and further configure itself as a low linearity receiver operating at a second power consumption in the second mode when the blocker output signal indicates an absence of the blocker in the radio frequency input signal. The high linearity receiver exhibits a higher level of linearity than the low linearity receiver, and the first power consumption is greater than the second power consumption.

In an Example 3, in Examples 1 or 2 the configurable receiver circuit is configured to configure itself as a current mode receiver in the first mode when the blocker output signal indicates a presence of the blocker in the radio frequency input signal, and further configure itself as a voltage mode receiver in the second mode when the blocker output signal indicates an absence of the blocker in the radio frequency input signal.

In an Example 4, in Example 3 the configurable receiver circuit configured as a current mode receiver comprises a transconductance amplifier circuit configured to receive the RF input signal as an RF voltage signal and convert the RF voltage signal to an RF current signal, and a passive mixer circuit configured to receive the RF current signal and down-convert the RF current signal to a baseband current signal. The configurable receiver circuit further comprises a transimpedance amplifier circuit configured to receive the baseband current signal and generate an output voltage signal based thereon.

In an Example 5, in Example 3 the configurable receiver circuit configured as the voltage mode receiver comprises an active feedback amplifier circuit configured to receive the RF input signal as a voltage signal and output an amplified RF voltage signal based thereon, and a passive mixer circuit configured to receive the amplified RF voltage signal and down-convert the amplified RF voltage signal to an amplified baseband voltage signal. The configurable receiver circuit further comprises a baseband amplifier circuit comprising a stacked complementary common-source architecture configured to receive the amplified baseband voltage signal and output a further amplified baseband voltage signal based thereon.

In an Example 6, in any of Examples 1-5 the blocker detector circuit is arranged with the configurable receiver circuit in a feedforward loop architecture.

In an Example 7, in any of Examples 1-6 the blocker detector circuit comprises a peak detector circuit configured to receive the RF input signal and generate a peak detector output signal indicative of whether a blocker exists in the RF input signal, and a latch circuit configured to output the blocker detection signal based on the peak detector output signal, wherein the blocker detection signal is latched to a high state when the peak detector output signal is indicative of an existence of a blocker in the RF input signal, and wherein the blocker detection signal is latched to a low state when the peak detector output signal is indicative of an absence of a blocker in the RF input signal.

In an Example 8, a method of receiving and processing a radio frequency (RF) signal comprises receiving the RF signal, evaluating whether the received RF signal contains a blocker using an evaluation circuit to generate an evaluation result signal, and selectively configuring a receiver circuit into one of a first mode comprising a first linearity characteristic and a second mode comprising a second linearity characteristic based on the evaluation result signal.

In an Example 9, in Example 8 evaluating whether the received RF signal contains a blocker comprises detecting a peak in the received RF signal using a peak detector circuit, and generating the evaluation result as an output of the comparator circuit based on the comparing.

In an Example 10, in Example 9 detecting the peak in the received signal further comprises comparing the detected peak to a predetermined threshold using a comparator circuit, and outputting a signal having a state indicative of a comparison result of the comparator circuit.

In an Example 11, in Example 9 comparing using the comparator circuit further comprises gating the comparison result using a latch that is gated with a clock signal from an oscillator circuit.

In an Example 12, in any of Examples 8-11 selectively configuring the receiver circuit into the first mode comprises configuring the receiver circuit into a voltage-mode receiver circuit comprising the first linearity characteristic.

In an Example 13, in Example 12 configuring the receiver circuit into a voltage-mode receiver circuit comprises receiving the RF signal using a transconductance amplifier having an active feedback configuration for input impedance matching, and separating the RF signal output from the transconductance amplifier using a four-phase passive mixer circuit to generate four RF signal portions in four signal branches, respectively. Configuring the receiver circuit further comprises separately amplifying each separated RF signal portion via a voltage-mode amplifier having a high input impedance.

In an Example 14, in Example 12 selectively configuring the receiver circuit into the second mode comprises configuring the receiver circuit into a current-mode receiver circuit comprising the second linearity characteristic.

In an Example 15, in Example 14 configuring the receiver circuit into a current-mode receiver circuit comprises receiving the RF signal using a transconductance amplifier having a passive feedback configuration for input impedance matching, and separating the RF signal output from the transconductance amplifier using a four-phase passive mixer circuit to generate four RF signal portions in four signal branches, respectively. Configuring the receiver circuit further comprises separately amplifying each separated RF signal portion via a transimpedance amplifier having a low input impedance, and performing a voltage gain amplification of each separated RF signal portion.

In an Example 16, a receiver system is disclosed and comprises a blocker detector circuit configured to receive a radio frequency (RF) input signal and detect an existence of a blocker therein, and further configured to output a blocker detection signal indicative of the existence of the blocker. The receiver system further comprises a configurable receiver circuit configured to receive the RF input signal and the blocker detection signal, and selectively configure the configurable receiver circuit between a first mode wherein the configurable receiver circuit is configured as a current-mode receiver configuration, and a second mode wherein the configurable receiver circuit is configured as a voltage-mode receiver configuration. The configurable receiver circuit is configured to change the configuration thereof between the current-mode receiver configuration and the voltage-mode receiver configuration by altering a switching state of a plurality of switches based on the blocker detection signal.

In an Example 17, in Example 16 the configurable receiver circuit comprises a first stage, and the first stage comprises a transconductance amplifier circuit having a high input impedance, an active feedback circuit coupled between an input and an output of the transconductance amplifier through a switch that is closed in the second mode and open in the first mode, thereby providing a low input impedance in the second mode, and a passive feedback circuit coupled between a later stage in the configurable receiver and the input of the transconductance amplifier through a switch that is closed in the first mode and open in the second mode, thereby providing a low input impedance in the first mode.

In an Example 18, in Example 17 the configurable receiver circuit further comprises a second stage, and the second stage comprises a four-phase passive mixer circuit configured to receive the RF signal from the transconductance amplifier and separate the RF signal into four separate signal portions along four different branches.

In an Example 19, in Example 18 the configurable receiver circuit further comprises a third stage, and the third stage comprises a baseband amplifier circuit having inputs of each of the four different branches, respectively. The third stage further comprises an RC feedback network connected between the output and the input of the baseband amplifier circuit through a switch, thereby reducing an input impedance of the baseband amplifier circuit when the switch is closed. The switch is closed in the first mode and open in the second mode.

In an Example 20, in Example 19 the configurable receiver further comprises a fourth stage, and the fourth stage comprises a voltage gain amplifier circuit configured to selectively receive an input of the baseband amplifier circuit via a switch, wherein when the switch is closed the voltage gain amplifier is bypassed in the second mode and wen the switch is open the voltage gain amplifier circuit is not bypassed in the first mode.

In an Example 21, in any of the Examples 16-20 the blocker detector circuit comprises a peak detector circuit configured to receive the RF input signal and output a notification signal upon occurrence of the blocker in the RF input signal.

In an Example 22, in Example 21 the peak detector circuit comprises a source follower circuit having a current source circuit and a capacitance in parallel with the current source circuit at an output thereof, wherein a current magnitude of the current source circuit and the capacitance sets a bandwidth of the peak detector circuit to remove a carrier frequency component of the RF input signal. The peak detector circuit further comprises a comparator circuit configured to receive a signal at the output of the source follower circuit and compare the received signal to a predetermined threshold and latch a high value as the notification signal if the received signal is greater than the predetermined threshold.

In an Example 23, in Example 22 the peak detector circuit further comprises an oscillator circuit configured to output an oscillator signal that is coupled to the comparator circuit, wherein the comparator circuit is configured to latch an output comparison result at a timing based on a gating by the oscillator signal.

In an Example 24, in Example 23 the oscillator circuit comprises a voltage controlled oscillator circuit configured to receive a varying control signal and output a varying oscillator signal in response thereto, wherein the varying oscillator signal varies a timing frequency of a gating of the comparator circuit.

In an Example 25, a receiver system is disclosed and comprises means for receiving the RF signal, means for evaluating whether the received RF signal contains a blocker using an evaluation means to generate an evaluation result signal, and means for selectively configuring a receiving means into one of a first mode comprising a first linearity characteristic and a second mode comprising a second linearity characteristic based on the evaluation result signal.

In an Example 26, in Example 25 the means for evaluating whether the received RF signal contains a blocker comprises means for detecting a peak in the received RF signal, and means for generating the evaluation result as an output of the comparing means based on the comparing.

In an Example 27, in Example 26 the means for detecting the peak in the received signal further comprises means for comparing the detected peak to a predetermined threshold, and means for outputting a signal having a state indicative of a comparison result of the comparing means.

In an Example 28, in Example 26 the comparing means further comprises means for gating the comparison result using a latching means that is gated with a clock signal from an oscillator means.

In an Example 29, in any of Examples 25-28 the means for selectively configuring the receiving means into the first mode comprises means for configuring the receiving means into a voltage-mode receiving means comprising the first linearity characteristic.

In an Example 30, in Example 29 the means for configuring the receiving means into a voltage-mode receiving means comprises means for receiving the RF signal using a transconductance means having an active feedback configuration for input impedance matching, means for separating the RF signal output from the transconductance means using a four-phase passive mixing means to generate four RF signal portions in four signal branches, respectively, and means for separately amplifying each separated RF signal portion via a voltage-mode amplifying means having a high input impedance.

In an Example 31, in Example 29 the means for selectively configuring the receiving means into the second mode comprises configuring the receiving means into a current-mode receiving means comprising the second linearity characteristic.

In an Example 32, in Example 31 the means for configuring the receiving means into a current-mode receiving means comprises means for receiving the RF signal using a transconductance means having a passive feedback configuration for input impedance matching, means for separating the RF signal output from the transconductance means using a four-phase passive mixing means to generate four RF signal portions in four signal branches, respectively. The configuring means for comprises means for separately amplifying each separated RF signal portion via a transimpedance means having a low input impedance, and means for performing a voltage gain amplification of each separated RF signal portion.

It should be understood that although various examples are described separately above for purposes of clarity and brevity, various features of the various examples may be combined and all such combinations and permutations of such examples is expressly contemplated as falling within the scope of the present disclosure.

Although the disclosure has been illustrated and described with respect to one or more implementations, alterations and/or modifications may be made to the illustrated examples without departing from the spirit and scope of the appended claims. Furthermore, in particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the disclosure may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A receiver system, comprising:
    a blocker detector circuit configured to receive a radio frequency (RF) input signal and detect an existence of a blocker therein, and further configured to output a blocker detection signal indicative of the existence of the blocker; and
    a configurable receiver circuit configured to receive the RF input signal and the blocker detection signal, and selectively configure the configurable receiver circuit between a first mode wherein the configurable receiver circuit exhibits first linearity characteristics, and a second mode wherein the configurable receiver circuit exhibits second, different linearity characteristics based on the blocker detection signal,
    wherein the configurable receiver circuit is configured to configure itself as a high linearity receiver operating at a first power consumption in the first mode when the blocker output signal indicates a presence of the blocker in the radio frequency input signal, and further configure itself as a low linearity receiver operating at a second power consumption in the second mode when the blocker output signal indicates an absence of the blocker in the radio frequency input signal, wherein the high linearity receiver exhibits a higher level of linearity than the low linearity receiver, and wherein the first power consumption is greater than the second power consumption.

2. The receiver system of claim 1, wherein the blocker detector circuit is arranged with the configurable receiver circuit in a feedforward loop architecture.

3. The receiver system of claim 1, wherein the blocker detector circuit comprises:
    a peak detector circuit configured to receive the RF input signal and generate a peak detector output signal indicative of whether a blocker exists in the RF input signal; and
    a latch circuit configured to output the blocker detection signal based on the peak detector output signal, wherein the blocker detection signal is latched to a high state when the peak detector output signal is indicative of an existence of a blocker in the RF input signal, and wherein the blocker detection signal is latched to a low state when the peak detector output signal is indicative of an absence of a blocker in the RF input signal.

4. A receiver system, comprising:
    a blocker detector circuit configured to receive a radio frequency (RF) input signal and detect an existence of a blocker therein, and further configured to output a blocker detection signal indicative of the existence of the blocker; and
    a configurable receiver circuit configured to receive the RF input signal and the blocker detection signal, and selectively configure the configurable receiver circuit between a first mode wherein the configurable receiver circuit exhibits first linearity characteristics, and a second mode wherein the configurable receiver circuit exhibits second, different linearity characteristics based on the blocker detection signal,
    wherein the configurable receiver circuit is configured to configure itself as a current mode receiver in the first mode when the blocker output signal indicates a presence of the blocker in the radio frequency input signal, and further configure itself as a voltage mode receiver in the second mode when the blocker output signal indicates an absence of the blocker in the radio frequency input signal.

5. The receiver system of claim 4, wherein the configurable receiver circuit configured as a current mode receiver comprises:
    a transconductance amplifier circuit configured to receive the RF input signal as an RF voltage signal and convert the RF voltage signal to an RF current signal;
    a passive mixer circuit configured to receive the RF current signal and down-convert the RF current signal to a baseband current signal; and
    a transimpedance amplifier circuit configured to receive the baseband current signal and generate an output voltage signal based thereon.

6. The receiver system of claim 4, wherein the configurable receiver circuit configured as the voltage mode receiver comprises:
    an active feedback amplifier circuit configured to receive the RF input signal as a voltage signal and output an amplified RF voltage signal based thereon;
    a passive mixer circuit configured to receive the amplified RF voltage signal and down-convert the amplified RF voltage signal to an amplified baseband voltage signal; and
    a baseband amplifier circuit comprising a stacked complementary common-source architecture configured to receive the amplified baseband voltage signal and output a further amplified baseband voltage signal based thereon.

7. A method of receiving and processing a radio frequency (RF) signal, comprising:
receiving the RF signal;
evaluating whether the received RF signal contains a blocker using an evaluation circuit to generate an evaluation result signal; and
selectively configuring a receiver circuit into one of a first mode comprising a first linearity characteristic and a second mode comprising a second linearity characteristic based on the evaluation result signal,
wherein selectively configuring the receiver circuit into the first mode comprises configuring the receiver circuit into a voltage-mode receiver circuit comprising the first linearity characteristic.

8. The method of claim 7, wherein evaluating whether the received RF signal contains a blocker comprises:
detecting a peak in the received RF signal using a peak detector circuit; and
generating the evaluation result as an output of the comparator circuit based on the comparing.

9. The method of claim 8, wherein detecting the peak in the received signal further comprises:
comparing the detected peak to a predetermined threshold using a comparator circuit; and
outputting a signal having a state indicative of a comparison result of the comparator circuit.

10. The method of 8, wherein the comparing using the comparator circuit further comprises gating the comparison result using a latch that is gated with a clock signal from an oscillator circuit.

11. The method of claim 7, wherein configuring the receiver circuit into a voltage-mode receiver circuit comprises:
receiving the RF signal using a transconductance amplifier having an active feedback configuration for input impedance matching;
separating the RF signal output from the transconductance amplifier using a four-phase passive mixer circuit generate four RF signal portions in four signal branches, respectively; and
separately amplifying each separated RF signal portion via a voltage-mode amplifier having a high input impedance.

12. The method of claim 7, wherein selectively configuring the receiver circuit into the second mode comprises configuring the receiver circuit into a current-mode receiver circuit comprising the second linearity characteristic.

13. The method of claim 12, wherein configuring the receiver circuit into a current-mode receiver circuit comprises:
receiving the RF signal using a transconductance amplifier having a passive feedback configuration for input impedance matching;
separating the RF signal output from the transconductance amplifier using a four-phase passive mixer circuit generate four RF signal portions in four signal branches, respectively;
separately amplifying each separated RF signal portion via a transimpedance amplifier having a low input impedance; and
performing a voltage gain amplification of each separated RF signal portion.

14. A receiver system, comprising:
a blocker detector circuit configured to receive a radio frequency (RF) input signal and detect an existence of a blocker therein, and further configured to output a blocker detection signal indicative of the existence of the blocker; and
a configurable receiver circuit configured to receive the RF input signal and the blocker detection signal, and selectively configure the configurable receiver circuit between a first mode wherein the configurable receiver circuit is configured as a current-mode receiver configuration, and a second mode wherein the configurable receiver circuit is configured as a voltage-mode receiver configuration,
wherein the configurable receiver circuit is configured to change the configuration thereof between the current-mode receiver configuration and the voltage-mode receiver configuration by altering a switching state of a plurality of switches based on the blocker detection signal.

15. The receiver system of claim 14, wherein the configurable receiver circuit comprises a first stage, the first stage comprising:
a transconductance amplifier circuit having a high input impedance;
an active feedback circuit coupled between an input and an output of the transconductance amplifier through a switch that is closed in the second mode and open in the first mode, thereby providing a low input impedance in the second mode; and
a passive feedback circuit coupled between a later stage in the configurable receiver and the input of the transconductance amplifier through a switch that is closed in the first mode and open in the second mode, thereby providing a low input impedance in the first mode.

16. The receiver system of claim 15, wherein the configurable receiver circuit further comprises a second stage, the second stage comprising a four-phase passive mixer circuit configured to receive the RF signal from the transconductance amplifier and separate the RF signal into four separate signal portions along four different branches.

17. The receiver system of claim 16, wherein the configurable receiver circuit further comprises a third stage, the third stage comprising:
a baseband amplifier circuit having inputs of each of the four different branches, respectively; and
an RC feedback network connected between the output and the input of the baseband amplifier circuit through a switch, thereby reducing an input impedance of the baseband amplifier circuit when the switch is closed,
wherein the switch is closed in the first mode and open in the second mode.

18. The receiver system of claim 17, wherein the configurable receiver further comprises a fourth stage, the fourth stage comprising a voltage gain amplifier circuit configured to selectively receive an input of the baseband amplifier circuit via a switch, wherein when the switch is closed the voltage gain amplifier is bypassed in the second mode and wen the switch is open the voltage gain amplifier circuit is not bypassed in the first mode.

19. The receiver system of claim 14, wherein the blocker detector circuit comprises a peak detector circuit configured to receive the RF input signal and output a notification signal upon occurrence of the blocker in the RF input signal.

20. The receiver system of claim 19, wherein the peak detector circuit comprises:

a source follower circuit having a current source circuit and a capacitance in parallel with the current source circuit at an output thereof, wherein a current magnitude of the current source circuit and the capacitance sets a bandwidth of the peak detector circuit to remove a carrier frequency component of the RF input signal; and a comparator circuit configured to receive a signal at the output of the source follower circuit and compare the received signal to a predetermined threshold and latch a high value as the notification signal if the received signal is greater than the predetermined threshold.

21. The receiver system of claim 20, wherein the peak detector circuit further comprises an oscillator circuit configured to output an oscillator signal that is coupled to the comparator circuit, wherein the comparator circuit is configured to latch an output comparison result at a timing based on a gating by the oscillator signal.

22. The receiver system of claim 21, wherein the oscillator circuit comprises a voltage controlled oscillator circuit configured to receive a varying control signal and output a varying oscillator signal in response thereto, wherein the varying oscillator signal varies a timing frequency of a gating of the comparator circuit.

* * * * *